US010860716B2

(12) United States Patent
Saldanha et al.

(10) Patent No.: US 10,860,716 B2
(45) Date of Patent: Dec. 8, 2020

(54) DETECTING MALWARE CONCEALED BY DELAY LOOPS OF SOFTWARE PROGRAMS

(71) Applicant: Juniper Networks, Inc., Sunnyvale, CA (US)

(72) Inventors: Anoop Wilbur Saldanha, Mangalore (IN); Paul Randee Dilim Kimayong, Rizal (PH); Abhijit Mohanta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 295 days.

(21) Appl. No.: 15/934,356

(22) Filed: Mar. 23, 2018

(65) Prior Publication Data
US 2019/0294791 A1     Sep. 26, 2019

(51) Int. Cl.
  *G06F 21/00* (2013.01)
  *G06F 21/56* (2013.01)
  *G06F 11/36* (2006.01)
  *G06F 21/55* (2013.01)

(52) U.S. Cl.
  CPC ........ *G06F 21/563* (2013.01); *G06F 11/3624* (2013.01); *G06F 21/554* (2013.01); *G06F 21/566* (2013.01); *G06F 2221/033* (2013.01)

(58) Field of Classification Search
  CPC ...... G06F 21/566; G06F 21/56; G06F 21/554; G06F 2221/034; G06F 21/568
  See application file for complete search history.

(56) References Cited

U.S. PATENT DOCUMENTS 9,817,974 B1 * 11/2017 Huang ................ G06F 21/563
9,900,324 B1 *  2/2018 Barua ................. H04L 63/14

FOREIGN PATENT DOCUMENTS

EP       1297401 A2     4/2003

OTHER PUBLICATIONS

Extended European Search Report for Application No. EP19162753.8, dated Jul. 5, 2019, 9 pages.
Kolbitsch C., et al., "The Power of Procrastination: Detection and Mitigation of Execution-Stalling Malicious Code," Proceedings of the 18th ACM Conference on Computer and Communications Security, Oct. 17, 2011, pp. 285-296. XP058006059.

* cited by examiner

*Primary Examiner* — Ghazal B Shehni
(74) *Attorney, Agent, or Firm* — Harrity & Harrity, LLP

(57) ABSTRACT

A device receives a software program with potential malware and a loop to conceal the potential malware, and processes the software program, with a loop identification technique, to identify the loop in the software program. The device modifies, with a loop exit technique and based on data from the loop identification technique, the software program to exit the loop, and processes the software program, with a malware detection technique and after modifying the software program to exit the loop, to determine whether the software program contains malware. The device causes one or more actions to be performed based on a result of processing the software program with the malware detection technique.

20 Claims, 11 Drawing Sheets

DETECTING MALWARE CONCEALED BY DELAY LOOPS OF SOFTWARE PROGRAMS

BACKGROUND

Malicious software, or malware, may include a variety of forms of hostile or intrusive software, such as computer viruses, worms, Trojan horses, ransomware, spyware, adware, scareware, and/or the like. Malware may be provided via executable code, scripts, active content, and/or the like. Malware may be defined by malicious intent (e.g., acting against requirements of a computer user) and may not include software that causes unintentional harm due to some deficiency.

SUMMARY

According to some implementations, a device may include one or more memories, and one or more processors to receive a software program with potential malware and a loop to conceal the potential malware, and process the software program, with a loop identification technique, to identify the loop in the software program. The one or more processors may modify, with a loop exit technique and based on data from the loop identification technique, the software program to exit the loop, and may process the software program, with a malware detection technique and after modifying the software program to exit the loop, to determine whether the software program contains malware. The one or more processors may cause one or more actions to be performed based on a result of processing the software program with the malware detection technique.

According to some implementations, a non-transitory computer-readable medium may store instructions that include one or more instructions that, when executed by one or more processors, cause the one or more processors to receive a software program with potential malware and a loop to conceal the potential malware, and identify the loop in the software program with a loop identification technique. The one or more instructions may cause the one or more processors to modify, with a loop exit technique and based on data from the loop identification technique, the software program to exit the loop, and process the software program, with a malware detection technique and after modifying the software program to exit the loop, to determine whether the software program contains malware. The one or more instructions may cause the one or more processors to determine that the software program contains malware based on processing the software program with the malware detection technique, and cause one or more actions to be performed based on determining that the software program contains malware.

According to some implementations, a method may include receiving, by a device, a software program with potential malware and a loop to conceal the potential malware, and processing, by the device, the software program, with a loop identification technique, to identify the loop in the software program. The method may include modifying, by the device, the software program to exit the loop using a loop exit technique and based on data from the loop identification technique, and processing, by the device and after modifying the software program to exit the loop, the software program with a malware detection technique to determine whether the software program contains malware. The method may include selectively performing, by the device, an action based on a result of processing the software program with the malware detection technique, where the action includes a first action when the software program contains malware, and the action includes a second action when the software program does not contain malware.

DETAILED DESCRIPTION

Figure 1A:
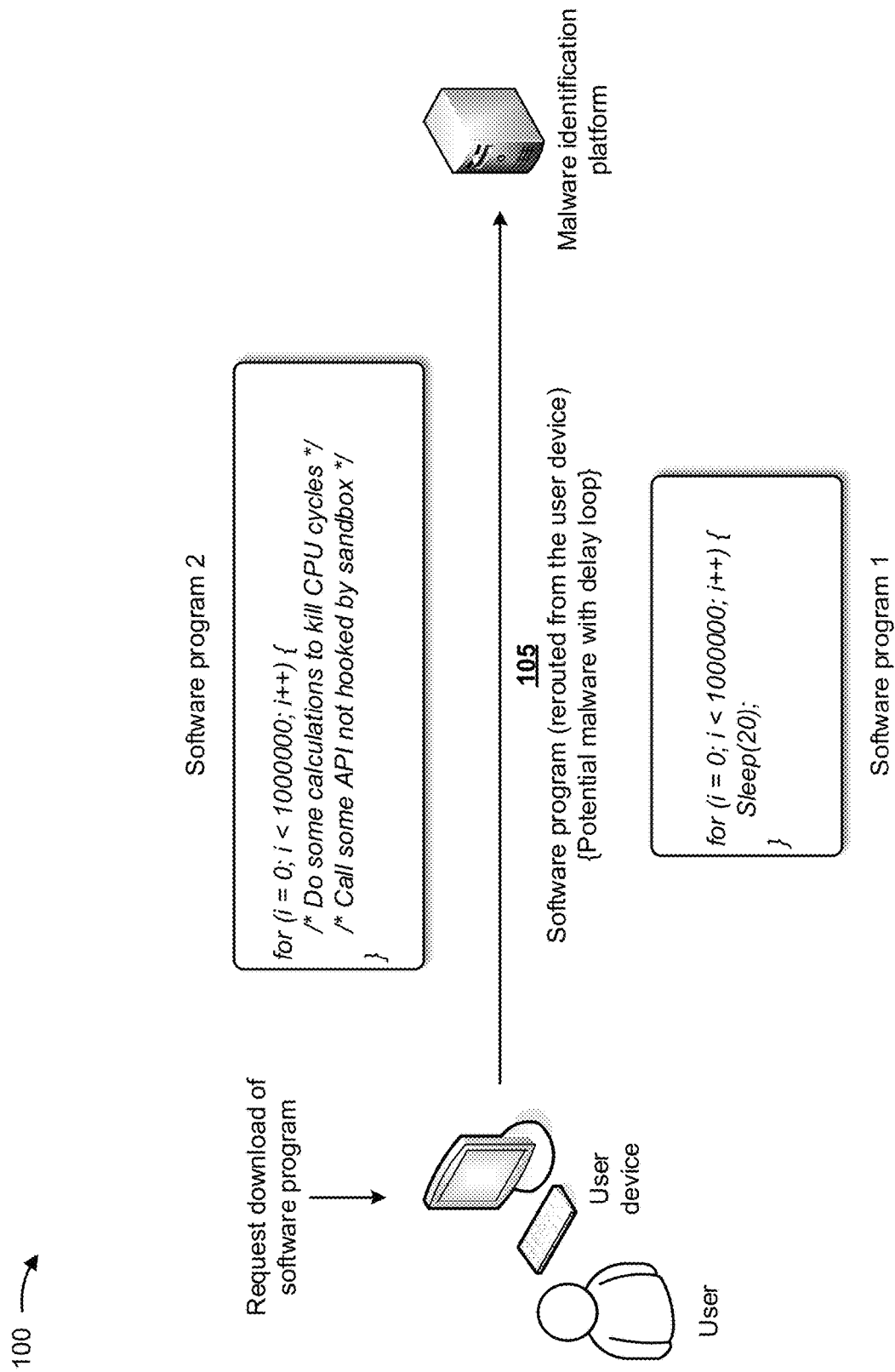
FIGS. 1A-1H are diagrams of an overview of an example implementation described herein.

The following detailed description of example implementations refers to the accompanying drawings. The same reference numbers in different drawings may identify the same or similar elements.

Malware uses different kinds of armoring to prevent dynamic analysis and detection in a testing sandbox. One type of armoring includes utilization of delay techniques. Since malware executes for a finite amount of time in a testing sandbox, any type of delay tactic, unless mitigated, results in reduced efficacy in ascertaining a program as malware, as well as determining an actual intent of the malware.

One type of delay technique includes calling an application programming interface (API) (e.g., a Sleep API), or any sleep-based API variants, from within a loop. Another type of delay technique includes armoring in the form of delay loops. One variant of these delay loops includes loops that repeatedly call some unnecessary API (e.g., DUMMY_API) with an intent to further add to the delay introduced by the loop. This can lead to decreased productivity of the testing sandbox and to decreased malware detection. For example, armoring in the form of delay loops reduces logging of more meaningful APIs and/or traces in the software program. Furthermore, if the testing sandbox captures or hooks the DUMMY_API, trace logs will contain the DUMMY_API traces, and if the testing sandbox has a limit on a total number of API calls/traces that can be logged, the trace logs may not include any API traces (e.g., of the software program) other than DUMMY_API traces. This limits detection of a quantity of meaningful traces, and further degrades malware detection and ascertainment of malware intent.

Some implementations described herein provide a malware detection platform that detects malware concealed by delay loops of software programs. For example, the malware detection platform may receive a software program with potential malware and a loop to conceal the potential malware, and may process the software program, with a loop identification technique, to identify the loop in the software program. The malware detection platform may process the identified loop in the software program, with a loop exit technique and based on data from the loop identification technique, to exit the loop in the software program. The malware detection platform may process, with a malware detection technique, a remaining portion of the software program, other than the loop, to determine whether the software program contains malware, and may perform one or more actions based on whether the software program contains malware.

In some implementations, the software program may execute particular APIs (e.g., win32 APIs) that are hooked (e.g., code that intercepts information passed between software components). In some implementations, the malware detection platform may start the software program in a debugging mode that enables establishment and utilization of breakpoints (e.g., intentional stopping or pausing locations) in the software program. In some implementations, the malware detection platform may execute an external program apart from the software program (e.g., or an extra control thread with the software program), which waits for signals from the executing software program or proactively determines, without any signals from the executing software program, if the external program is inside any loops. If the external program is inside a loop, the malware detection platform may take steps to force the software program to exit the loop. In some implementations, the external program may pause and/or resume threads of the executing software program, and may perform other operations on the software program, such as reading, writing, updating and/or patching memory, reading, disassembling, updating and/or patching the software program, reading and/or updating registers of the software program, and/or the like. In this way, the malware detection platform may detect malware concealed by delay loops of software programs.

FIGS. 1A-1H are diagrams of an overview of an example implementation 100 described herein. As shown in FIG. 1A, a user device may be associated with a malware detection platform. As further shown in FIG. 1A, and by reference number 105, a user of the user device (e.g., via a user interface provided to the user) may cause the user device to download a software program, and the malware detection platform may test the software program for malware before allowing the user device to download the software program. In some implementations, the software program may include potential malware (e.g., to be detected by the malware detection platform) and one or more delay loops to prevent detection of the potential malware. In some implementations, the malware detection platform may receive the software program from another source other than the user device. For example, a security device operating on behalf of the user device may reroute the software program to the malware detection platform when the user device attempts to download the software program.

As further shown in FIG. 1A, in one example, a first software program (Software program 1) may include an API (e.g., a Sleep API) that has been hooked (e.g., code intercepting information passed between software components):

```
for (i = 0; i < 1000000; i++) {
    Sleep(20);
}.
```

In another example, as shown in FIG. 1A, a second software program (Software program 2) may include a loop that does not call an API or may include a loop that calls an API that has not been hooked:

```
for (i = 0; i < 1000000; i++) {
    /* Do some calculations just to kill CPU cycles */
    /* Call some API that is not hooked by the sandbox */
}.
```

In some implementations, the malware detection platform may utilize different loop identification techniques, to identify loops in a software program, depending on the content of the software program. For example, if the software program includes content similar to the first software program, the malware detection platform may utilize a first loop identification technique, as described below in connection with FIG. 1B. In another example, if the software program includes content similar to the second software program, the malware detection platform may utilize a second loop identification technique, as described below in connection with FIG. 1C. In some implementations, the malware detection platform may utilize one or more loop identification techniques that are different than the techniques described in connection with FIGS. 1B and 1C.

Figure 1B:
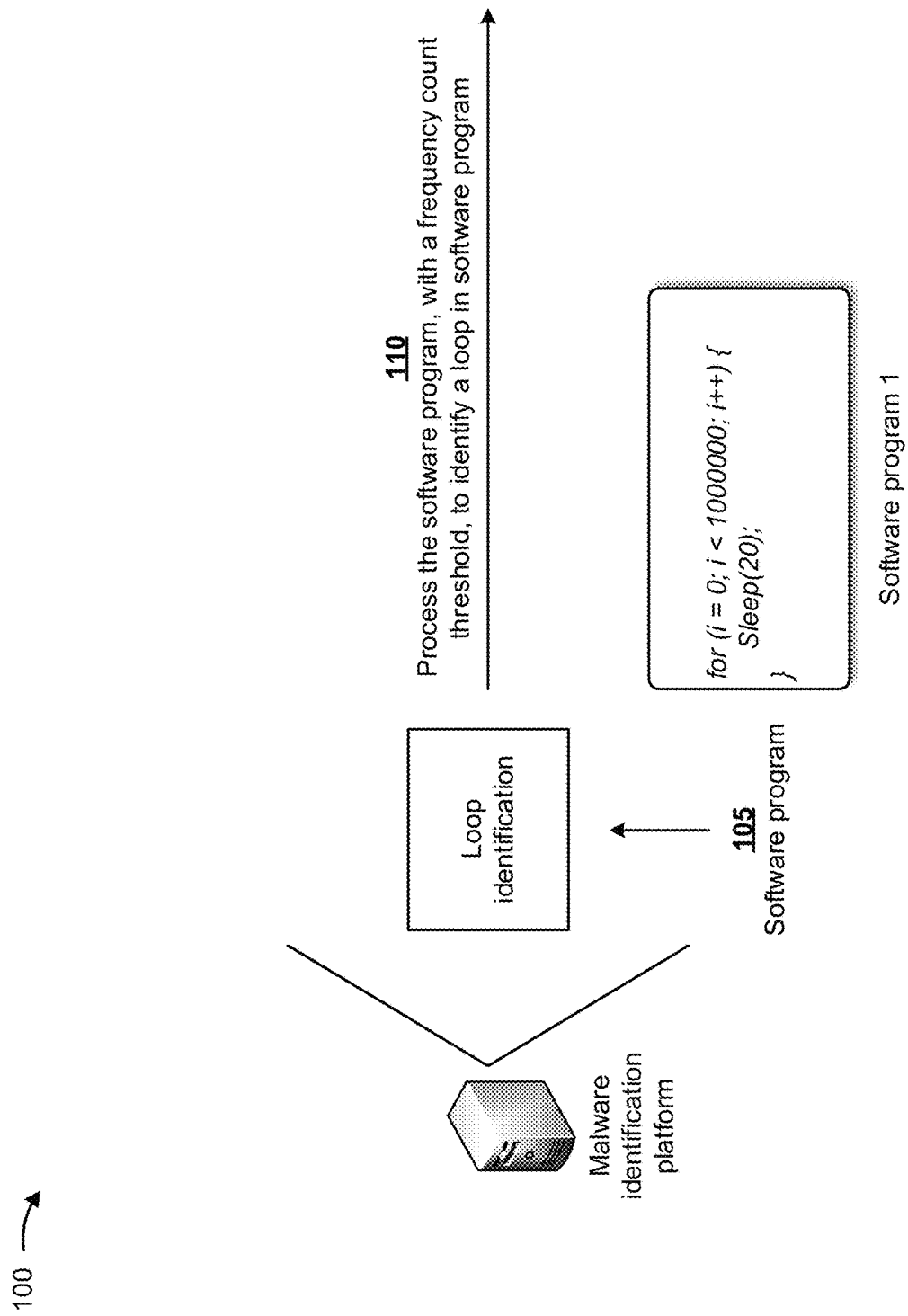

As shown in FIG. 1B, and by reference numbers 105 and 110, if the software program includes the first software program, the malware detection platform may process the software program, with a frequency count threshold, to identify a loop in the software program. In some implementations, the malware detection platform may determine whether the Sleep API hook executes a quantity of times that satisfies a frequency count threshold (e.g., fifty times per second, one-hundred times per second, one-thousand times per second, and/or the like). In such implementations, when the frequency count threshold is satisfied, the malware detection platform may determine that the software program hook (e.g., the Sleep API hook) is called by a loop. In some implementations, the frequency count threshold may be variable and adjustable. In some implementations, to further verify that the software program hook is called by a loop, the malware detection platform may check a return address of the software program hook from inside the software program hook. By obtaining the return address of the software program hook, the malware detection platform may calculate frequency counts against the return address, and may compare the frequency counts to the frequency count threshold.

In some implementations, the malware detection platform may utilize the frequency count threshold and the previously described techniques when the software program includes a same API that is called multiple times from a same loop, as set forth by the following example:

```
for (i = 0; i < 1000000; i++) {
    Sleep(20);
    Sleep(40);
}.
```

In some implementations, the malware detection platform may store the return address in a data structure (e.g., an array, such as INST[n]) that may be utilized to exit the loop, as described elsewhere herein. In such implementations, once the malware detection platform determines that the software program hook is called from a loop, the malware detection platform may store the return address in the array.

Figure 1C:
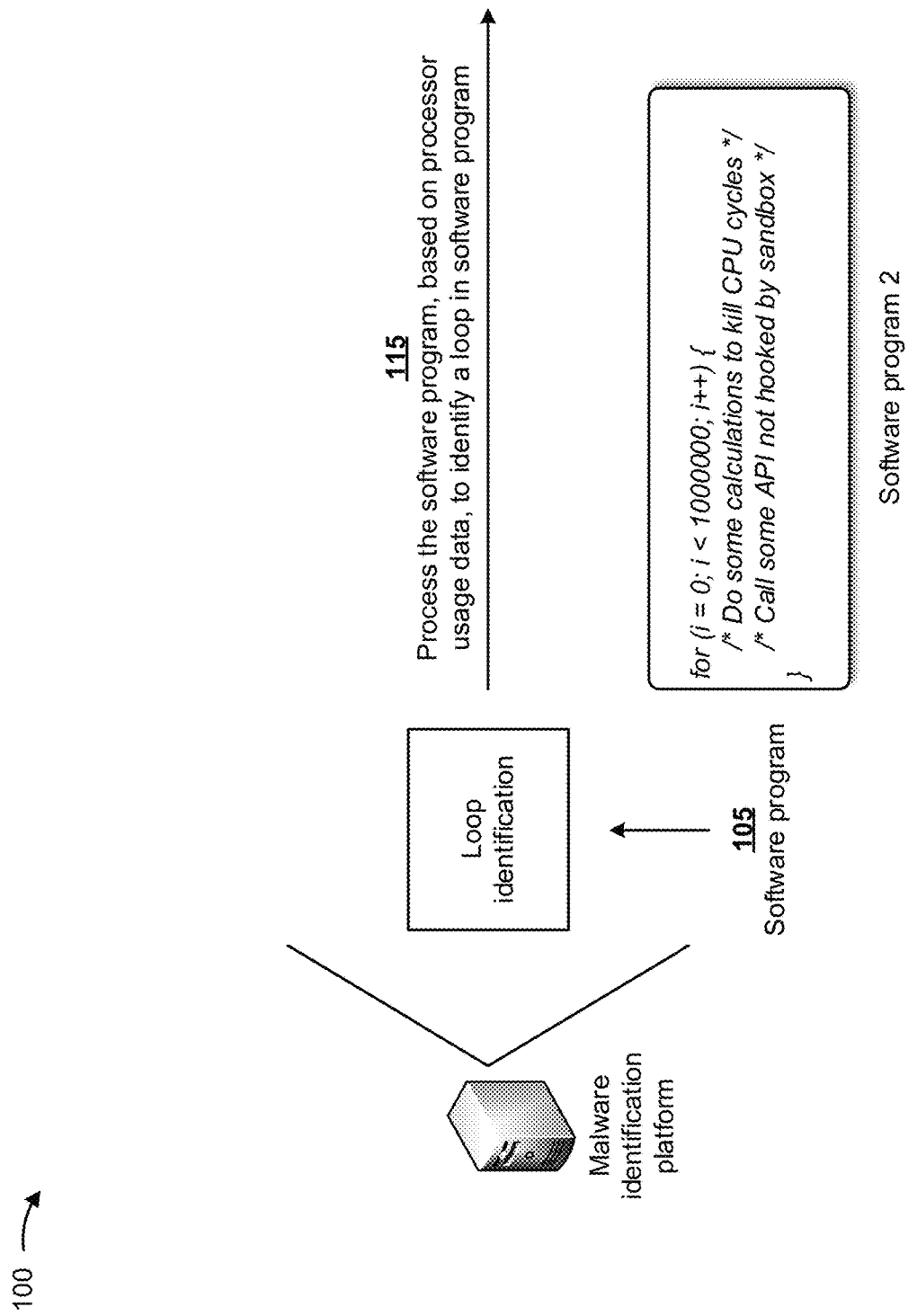

As shown in FIG. 1C, and by reference numbers 105 and 115, if the software program includes the second software program, the malware detection platform may process the software program, based on processor usage data, to identify a loop in the software program. In some implementations, to identify software programs with such loops, the malware detection platform may monitor processor usage by threads of the software program. If the processor usage satisfies a particular processor usage threshold (e.g., 60%, 70%, and/or the like, usage of a processor), the malware detection platform may determine that the software program includes one or more loops.

In some implementations, to verify that the second software program includes one or more loops, the malware detection platform may test an instruction pointer, for a thread of the software program, multiple times, as described below. Once enough tests are obtained, the malware detection platform may create a histogram of instruction addresses (e.g., data points) associated with the instruction pointer. If the histogram indicates that some instruction addresses, or a contiguous range of addresses, include a high data point count, the malware detection platform may determine that the software program includes one or more loops.

For example, assume that the software program includes a number (e.g., twelve) instructions (e.g., INSTRUCTION_01 through INSTRUCTION_12) and does not include a loop, or is not stuck in a loop. At any point in the software program, an instruction pointer of the software program may be located at any of the instructions (e.g., INSTRUCTION_01 through INSTRUCTION_12). If the malware detection platform pauses the software program and reviews the instruction pointer, the malware detection platform may determine that the instruction pointer is located at or between INSTRUCTION_01 through INSTRUCTION_12. If the malware detection platform makes such a determination, a large quantity of times and very quickly, the malware detection platform may generate a histogram (e.g., of data points) for each reviewed instruction. In such an example, since the software program does not include a loop, or is not stuck in a loop, the histogram may include a uniform distribution.

In another example, assume that the software program includes a loop, or is stuck in a loop (e.g., between INSTRUCTION_03 and INSTRUCTION_10). If the malware detection platform pauses the software program and reviews the instruction pointer, the malware detection platform may determine that the instruction pointer is located at or between INSTRUCTION_03 through INSTRUCTION_10. If the malware detection platform makes such a determination, a large quantity of times and very quickly, the malware detection platform may generate a histogram (e.g., of data points) for each reviewed instruction. In such an example, since the software program includes a loop, or is stuck in a loop, the histogram will not include a uniform distribution. Rather, the histogram may include a distribution that includes a high data point count for INSTRUCTION_03 through INSTRUCTION_10 and a low data point count for INSTRUCTION_01, INSTRUCTION_02, INSTRUCTION_11, and INSTRUCTION_12.

In some implementations, the malware detection platform may store information associated with the histogram (e.g., the addresses associated with the instruction pointer) in a data structure (e.g., the array INST[n]) that may be utilized to exit the loop, as described elsewhere herein.

In some implementations, the malware detection platform may utilize the processor usage data and the previously described histogram techniques when the software program includes more than one loop, as set forth by the following example:

```
for (i = 0; i < 10000000; i++) {
    /* Do some calculations just to kill CPU cycles */
    /* Call some API that is not hooked by the sandbox */
    for (j = 0; j < 50000; j++) {
        /* Do some calculations just to kill CPU cycles */
        /* Call some CPU that is not hooked by the sandbox */
    }
}.
```

In some implementations, the malware detection platform may utilize one or more loop exit techniques (e.g., or combinations of loop exit techniques) to exit loops in the software program. For example, the malware detection platform may utilize a first loop exit technique, as described below in connection with FIG. 1D, a second loop exit technique, as described below in connection with FIG. 1E, a third loop exit technique, as described below in connection with FIG. 1F, one or more combinations of the first loop exit technique, the second loop exit technique, and the third loop exit technique, and/or the like.

Figure 1D:
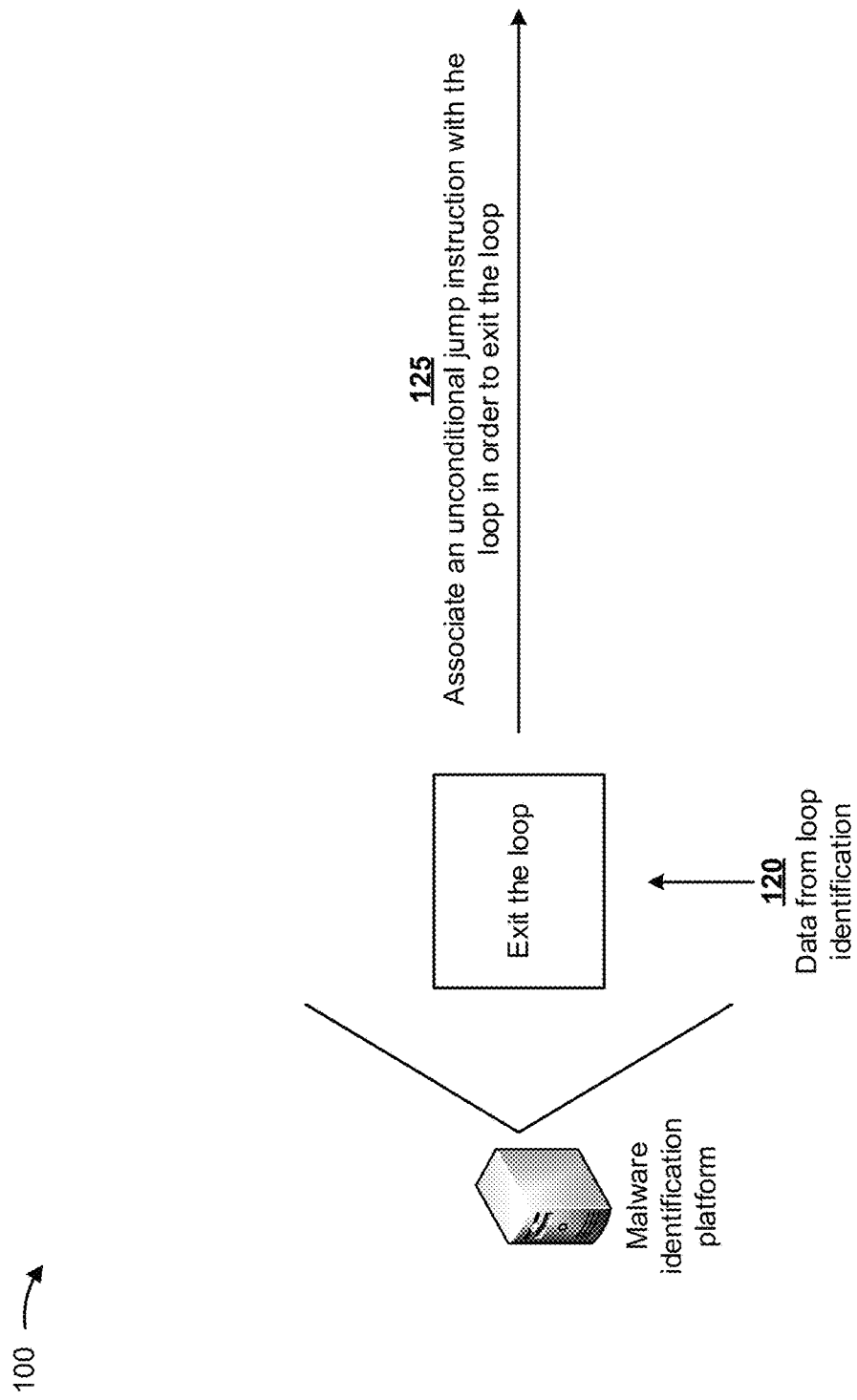

As shown in FIG. 1D, and by reference numbers 120 and 125, the malware detection platform may utilize a first loop exit technique that utilizes data determined from the loop identification and associates a particular instruction (e.g., an unconditional JUMP instruction) within the loop in order to exit the loop. In some implementations, the malware detection platform may utilize data determined from the identification of the loop (e.g., the data stored in the array INST[n]) when associating the unconditional JUMP instruction within the loop (e.g., since the data stored in the array identifies the loop in the software program). In some implementations, the malware detection platform may start the software program in a debugging mode to permit the malware detection platform to set breakpoints at particular instructions of the software program. In some implementations, the malware detection platform may modify the software program to include the unconditional JUMP instruction within the loop, and the unconditional JUMP instruction may cause the software program to move or jump to an instruction address to which the loop is to exit.

For example, the malware detection platform may modify the first software program to include the unconditional JUMP instruction as follows:

```
for (i = 0; i < 1000000; i++) {
    JUMP to ADDRESS A;
    Sleep(20);
}
ADDRESS A.
```

In another example, the malware detection platform may modify the second software program to include the unconditional JUMP instruction as follows:

```
for (i = 0; i < 1000000; i++) {
    JUMP to ADDRESS A;
    /* Do some calculations just to kill CPU cycles */
    /* Call some API that is not hooked by the sandbox */
}
ADDRESS A.
```

Figure 1E:
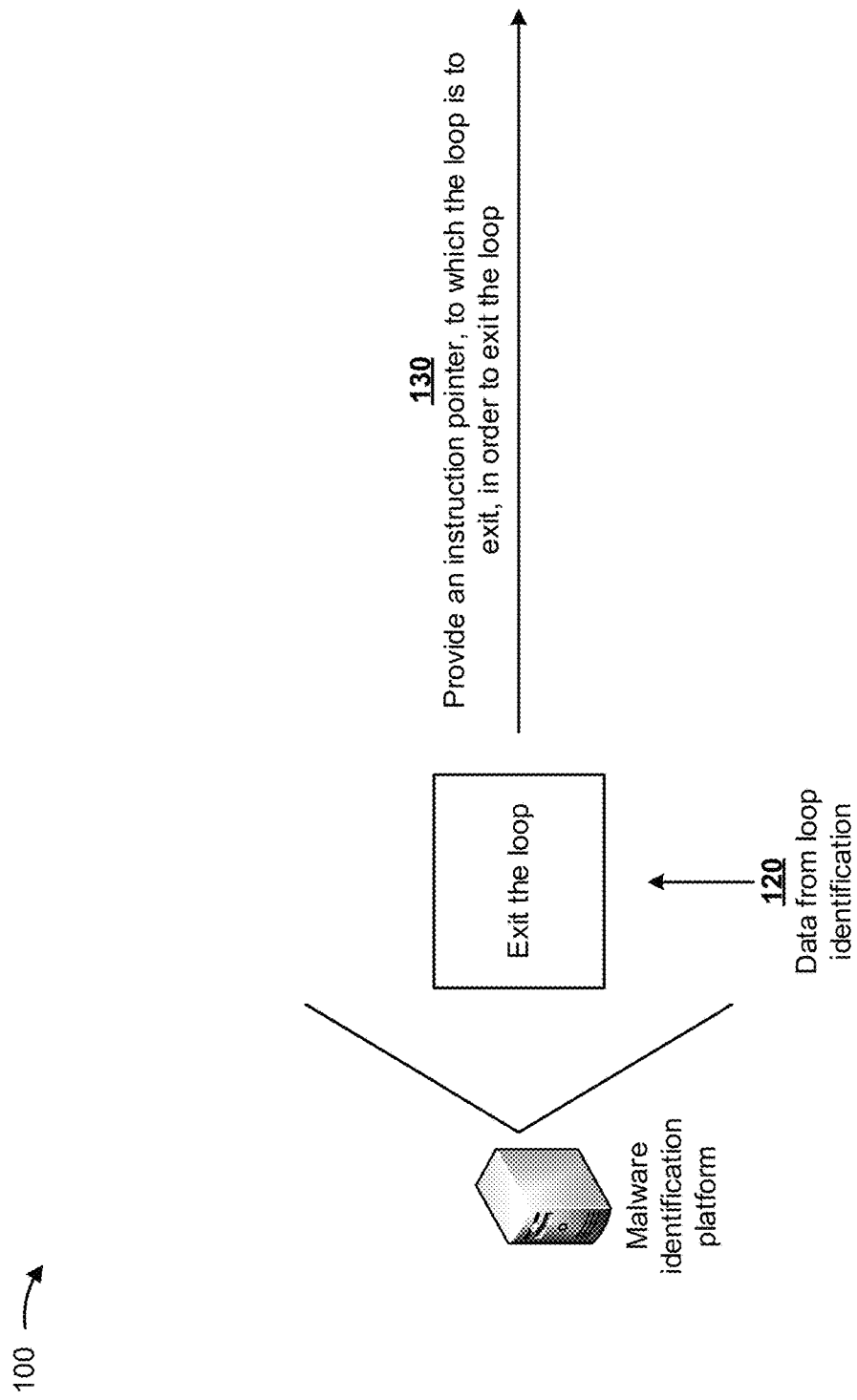

As shown in FIG. 1E, and by reference number 130, the malware detection platform may utilize a second loop exit technique that sets an instruction pointer, to an instruction to which the loop is to exit, in order to exit the loop. In some implementations, and as shown by reference number 120 in FIG. 1E, the malware detection platform may utilize the data determined from the identification of the loop (e.g., the data stored in the array INST) when setting the instruction pointer to the instruction to which the loop is to exit (e.g., since the data stored in the array identifies the loop in the software program).

For example, the malware detection platform may modify the first software program to set the instruction pointer, to the instruction to which the loop is to exit, as follows:

```
for (i = 0; i < 1000000; i++) {
    GOTO to INSTRUCTION B;
    Sleep(20);
}
INSTRUCTION B.
```

In another example, the malware detection platform may modify the second software program to set the instruction pointer, to the instruction to which the loop is to exit, as follows:

```
for (i = 0; i < 1000000; i++) {
    GOTO to INSTRUCTION B;
    /* Do some calculations just to kill CPU cycles */
    /* Call some API that is not hooked by the sandbox */
}
INSTRUCTION B.
```

Figure 1F:
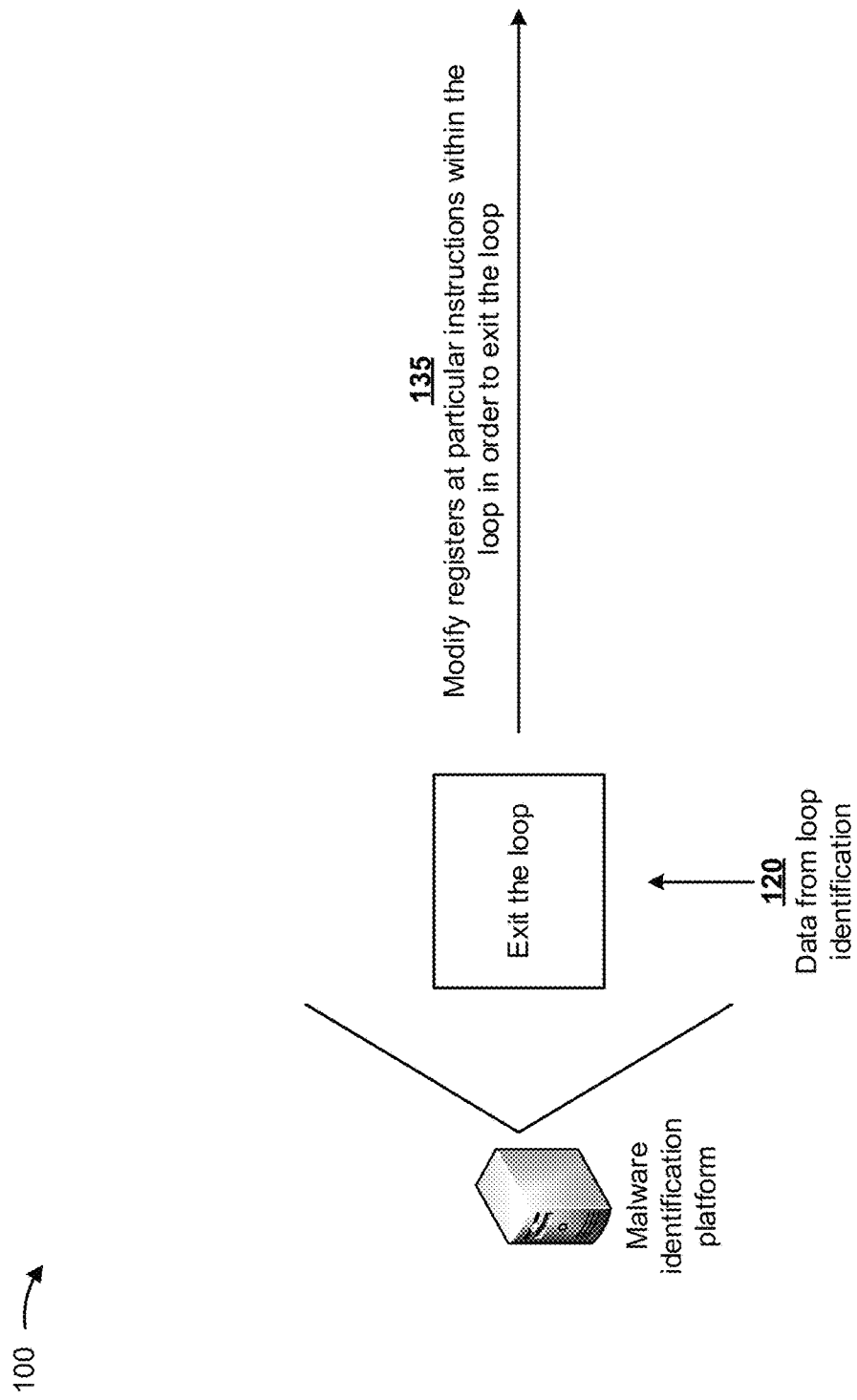

As shown in FIG. 1F, and by reference number 135, the malware detection platform may utilize a third loop exit technique that modifies registers at particular instructions within the loop in order to exit the loop. In some implementations, and as shown by reference number 120 in FIG. 1F, the malware detection platform may utilize the data determined from the identification of the loop (e.g., the data stored in the array INST) when modifying the registers at the particular instructions within the loop (e.g., since the data stored in the array identifies the loop in the software program). In some implementations, the malware detection platform may start the software program in a debugging mode to permit the malware detection platform to set breakpoints at particular instructions of the software program. In some implementations, the malware detection platform may modify any of the registers (e.g., control registers) at particular instructions (e.g., conditional JUMPs within the loop), and may utilize the registers to exit the loop.

In some implementations, in order to force an exit of the loop, the malware detection platform may pause execution of the software program, and may disassemble instructions around the loop. The malware detection platform may modify registers at a conditional JUMP instruction within the loop, and may utilize the modified registers to exit the loop.

In some implementations, after pausing execution of the software program, the malware detection platform may determine whether the instruction addresses in the array (e.g., the array INST) satisfy a particular address space (e.g., are within the particular address space, such as a win32 module address space). If a particular instruction address in the array satisfies the particular address space, the malware detection platform may move to a next instruction address in the array. If the particular instruction address in the array does not satisfy the particular address space (e.g., is not within the particular address space), the malware detection platform may update the array with the particular instruction address. In some implementations, the malware detection platform may continue this process until every instruction address in the array does not satisfy the particular address space.

After updating the array as described above, in some implementations, for each instruction address in the array (e.g., the array INST), the malware detection platform may disassemble instructions around the instruction address to determine a function associated with the instruction address. The malware detection platform may store a function start address and a function end address, associated with the function, in data structures (e.g., such as two arrays, FUNC_START and FUNC_END). In some implementations, the malware detection platform may remove any duplicate function entries from the two arrays (e.g., FUNC_START and FUNC_END), and may remove corresponding instruction address entries from the array (e.g., the array INST).

In some implementations, for instructions associated with each function stored in the two arrays (e.g., FUNC_START and FUNC_END), the malware detection platform may disassemble the instructions, and may identify loops in the disassembled instructions. The malware detection platform may select a loop from the identified loops, where the selected loop may include a particular instruction (e.g., INST[i]). The malware detection platform may store a start address and an end address of the selected loop at a corresponding index [i] in two data structures (e.g., such as two arrays, LOOP_START and LOOP_END). If the particular instruction INST[i] is not within any of the identified loops of the function (e.g., stored in FUNC_START and FUNC_END), the malware detection platform may not create a corresponding entry in the two arrays (e.g., LOOP_START and LOOP_END).

In some implementations, for each identified loop (e.g., LOOP_START[i] and LOOP_END[i]), the malware detection platform may determine exit instructions for the loop. In one example, the exit instructions may include a particular instruction (e.g., a COMPARE instruction) and a corresponding instruction (e.g., a corresponding conditional JUMP instruction) that exits the loop. At the corresponding conditional JUMP instruction, the malware detection platform may store an address and a first byte, associated with the corresponding conditional JUMP instruction, in data structures (e.g., such as two arrays, STORE_JMP_ADDRESS and STORE_JMP_BYTE). In some implementations, the malware detection platform may replace the first byte of the conditional JUMP instruction with a breakpoint instruction.

In some implementations, the malware detection platform may resume execution of the software program, and may encounter a breakpoint instruction. Upon encountering the breakpoint instruction, the malware detection platform may obtain an address (e.g., a breakpoint address) of a location of the breakpoint instruction. The malware detection platform may utilize the breakpoint address to identify an index in the STORE_JMP_ADDRESS array, and may utilize the index to retrieve a corresponding byte (e.g., which was replaced with the breakpoint instruction) from the STORE_JMP_BYTE array. The malware detection platform may restore the corresponding byte at the breakpoint address. In some implementations, and based on a type of conditional JUMP instruction that is present at the breakpoint address, the malware detection platform may update a corresponding register of the software program. In such implementations, and when execution of the software program is resumed, the conditional JUMP instruction may cause the software program to exit the loop.

Figure 1G:
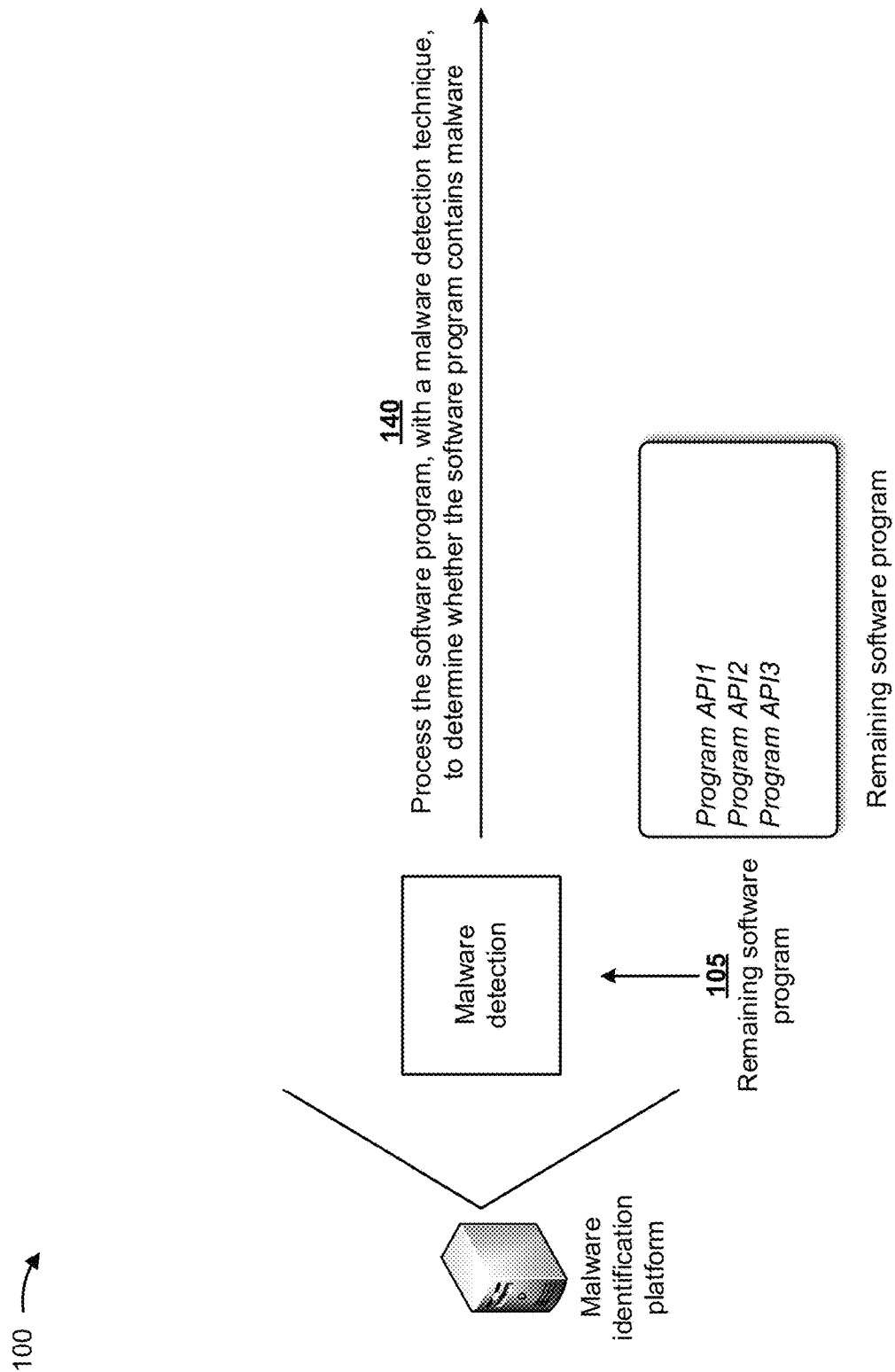

As shown in FIG. 1G, and by reference numbers 105 and 140, the malware detection platform may process the software program, with a malware detection technique, to determine whether the software program contains malware. In some implementations, the malware detection platform may process a remaining portion of the software program (e.g., other than portion(s) the software program containing loop(s)), with one or more malware detection techniques, to determine whether the software program contains malware. For example, as shown in FIG. 1G, the remaining portion of the software program may include Program AP1, Program AP2, Program AP3, etc.

In some implementations, the one or more malware detection techniques may include one or more of a signature-based technique, a behavioral-based technique, a heuristic scanning-based technique, a file analysis-based technique, a weight-based heuristic technique, a rule-based heuristic technique, an API call-based heuristic technique, a control flow graph-based heuristic technique, an N-Gram-based heuristic technique, an operational code-based heuristic technique, and/or the like.

The signature-based technique may include a malware detection technique that uses patterns extracted from various malware to identify an occurrence of any such malware in a software program. The signature-based technique identifies one or more such patterns (i.e., signatures) associated with a known malware threat. For example, a signature may include an algorithm or hash (e.g., a number derived from a string of text) that uniquely identifies specific malware. Depending on a type of scanner that is used to identify malware in the software program, the signature may be a static hash that includes a calculated numerical value of a snippet of code unique to the malware. To identify malware (e.g., viruses), the signature-based technique may compare the contents of a file to a dictionary of signatures (e.g., virus signatures).

The behavioral-based technique may include a malware detection technique that observes the behavior of a software program to determine whether the software program is malicious. In the behavioral-based technique, an object behavior (or potential behavior) is analyzed for suspicious activities. An attempt to perform an action that is clearly abnormal or unauthorized may indicate that the object is malicious or at least suspicious. Behaviors that indicate potential danger may include an attempt to discover a sandbox environment, disabling security controls, installing rootkits, registering for autostart, and/or the like. Unlike signature-based techniques, the behavioral-based technique may protect against new malware that does not exist in dictionaries. The behavioral-based technique may evaluate an object based on intended actions before the object can actually execute that behavior.

The heuristic scanning-based technique may include a malware detection technique that looks for certain instructions or commands within a software program that are not found in typical software programs. As a result, the heuristic scanning-based technique is able to detect potentially malicious functionality in new, previously unexamined, functionality such as a replication mechanism of a virus, a distribution routine of a worm, payload of a Trojan horse, and/or the like. The heuristic scanning-based technique may utilize data mining and/or machine learning techniques to learn a behavior of a software program.

The file analysis-based technique may include a malware detection technique that employs an in-depth observation of a file associated with a software program. Based on the in-depth observation, the file analysis-based technique may determine an intent, a destination, and/or a purpose of the file and/or the software program associated with the file. For example, if the file includes instructions to delete certain files, the file analysis-based technique may determine that the file is associated with malware.

The weight-based heuristic technique may include a malware detection technique that employs a heuristic engine dependent on a weight-based system. The weight-based heuristic technique may rate each detected software functionality with a certain weight according to a degree of danger that functionality may pose, and may determine whether malware is present based on results of weighting each functionality. For example, if a sum of weights reaches a certain threshold, the weight-based heuristic technique may trigger an alarm indicating a potential presence of malware.

The rule-based heuristic technique may include a malware detection technique that applies one or more rules to detect a potential presence of malware. For example, the rule-based heuristic technique may extract particular rules from a file of a software program, and may compare the particular rules against a set of rules associated with malicious code. If one or more of the particular rules match one or more rules associated with malicious code, the rule-based heuristic technique may trigger an alarm.

The API call-based heuristic technique may include a malware detection technique that analyzes API call sequences to identify a potential presence of malware. Almost all software programs use API calls to send requests to operating systems associated with execution of the software programs. The API call-based heuristic technique may identify suspicious functionality based on the API calls and the sequences in which the API calls occur. For example, the API call-based heuristic technique may extract an API call sequence from a software program, may process the API call sequence with a machine learning model, and may classify the software program as malware or benign based on a result of processing the API call with the machine learning model.

The control flow graph-based heuristic technique may include a malware detection technique that analyzes features of a control flow graph of a software program to identify a potential presence of malware. A control flow graph is a directed graph, where each node represents a statement of the software program and each edge represents a control flow between the statements. In the control flow graph-based heuristic technique, the control flow graph may include a representation, using graph notation, of all paths that might be traversed through the software program during execution of the software program. The control flow graph-based heuristic technique may identify malware in a software program by identifying, in a control flow graph of the software program, control flow graph features associated with malware.

The N-Gram-based heuristic technique may include a malware detection technique that analyzes N-Grams associated with a software program to identify a potential presence of malware. An N-Gram is a substring of a larger string such that the substring has a length of N. The N-Gram-based heuristic technique may identify malware in a software program by identifying, in the software program, one or more N-Grams that may be associated with malware.

The operational code-based heuristic technique may include a malware detection technique that analyzes operational codes associated with a software program to identify a potential presence of malware. An operational code (sometimes referred to as an OpCode) is the portion of a machine language instruction that identifies an operation to be performed. For example, in an instruction to add the contents of two registers, the operational code may correspond to an add operation. The operational code-based heuristic technique may identify malware in a software program by identifying, in the software program, one or more operational codes corresponding to operations that may be associated with malware.

In some implementations, the malware detection platform may utilize one or more of the malware detection techniques or a combination of two or more the malware detection techniques. In some implementations, the malware detection platform may perform an initial analysis of the software program, and may select a malware detection technique, or define an order of performance of malware detection techniques, based on the initial analysis. In such implementations, the malware detection platform may utilize the malware detection techniques to determine whether the software program includes malware.

Figure 1H:
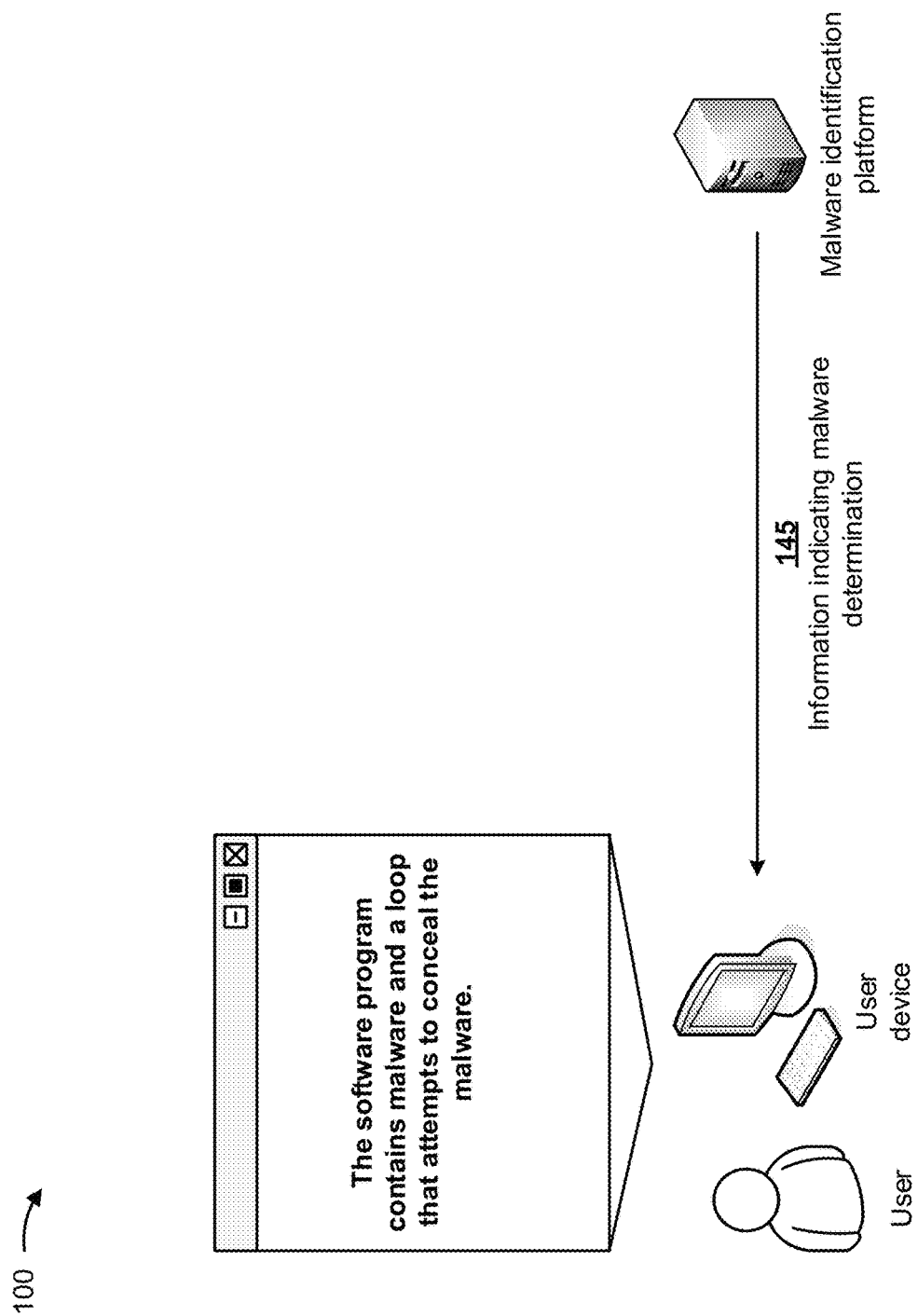

As shown in FIG. 1H, and by reference number 145, the malware detection platform may provide, to the user device, information indicating the malware determination (e.g., via a user interface). For example, the malware detection platform may provide information indicating that the software program contains malware and a loop that attempts to conceal the malware. In some implementations, the user device may receive the information from the malware detection platform, and may provide the information for display via the user interface (e.g., to a user of the user device).

In some implementations, the malware detection platform may automatically perform, or cause to be performed, one or more actions based on the malware determination. For example, if the malware detection platform determines that the software program contains malware, the malware detection platform may automatically prevent the user device from receiving the software program, which removes the possibility of the user device being infected with malware. The malware detection platform may remove the software program from the user device or instruct the user device to remove the software program from the user device, which may remove the possibility of the user device being infected with malware. The malware detection platform may quarantine the software program for further analysis, which may prevent the malware from spreading to the user device and/or other user devices. The malware detection platform may cause one or more network devices to update rules to block the software program, which may prevent the malware from spreading to other user devices. The malware detection platform may identify a source of the software program and may add information regarding the source to a blacklist, which may prevent spreading of the malware. The malware detection platform may identify a source of the software program and may notify the source of the issue. The malware detection platform may cause a malware detection program to execute on the user device, in order to have the malware removed from the user device. The malware detection platform may notify a network administrator about the detection of the malware so that the network administrator may address the issue. The malware detection platform may notify other network administrators (e.g., an administrator not associated with the malware detection platform or the user device) about the software program and the detection of malware (e.g., a global service to help prevent malware).

In some implementations, if the malware detection platform determines that the software program does not contain malware, the malware detection platform may cause the software program to be sent to the user device. The malware detection platform may identify a source of the software program, and may add information regarding the source to a whitelist. The malware detection platform may identify a source of the software program, and may notify the source that there are no malware issues with the software program. The malware detection platform may notify other network administrators (e.g., an administrator not associated with the malware detection platform or the user device) about the software program and that no malware was detected.

In this way, several different stages of the process for detecting malware concealed by delay loops of software programs are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to detect malware that includes armoring in the form of delay loops. Finally, automating the process for detecting malware concealed by delay loops of software programs conserves computing resources (e.g., processor resources, memory resources, and/or the like) that would otherwise be wasted in attempting to detect malware, and computing resources of the user device that would be wasted executing malware.

As indicated above, FIGS. 1A-1H are provided merely as examples. Other examples are possible and may differ from what was described with regard to FIGS. 1A-1H.

Figure 2:
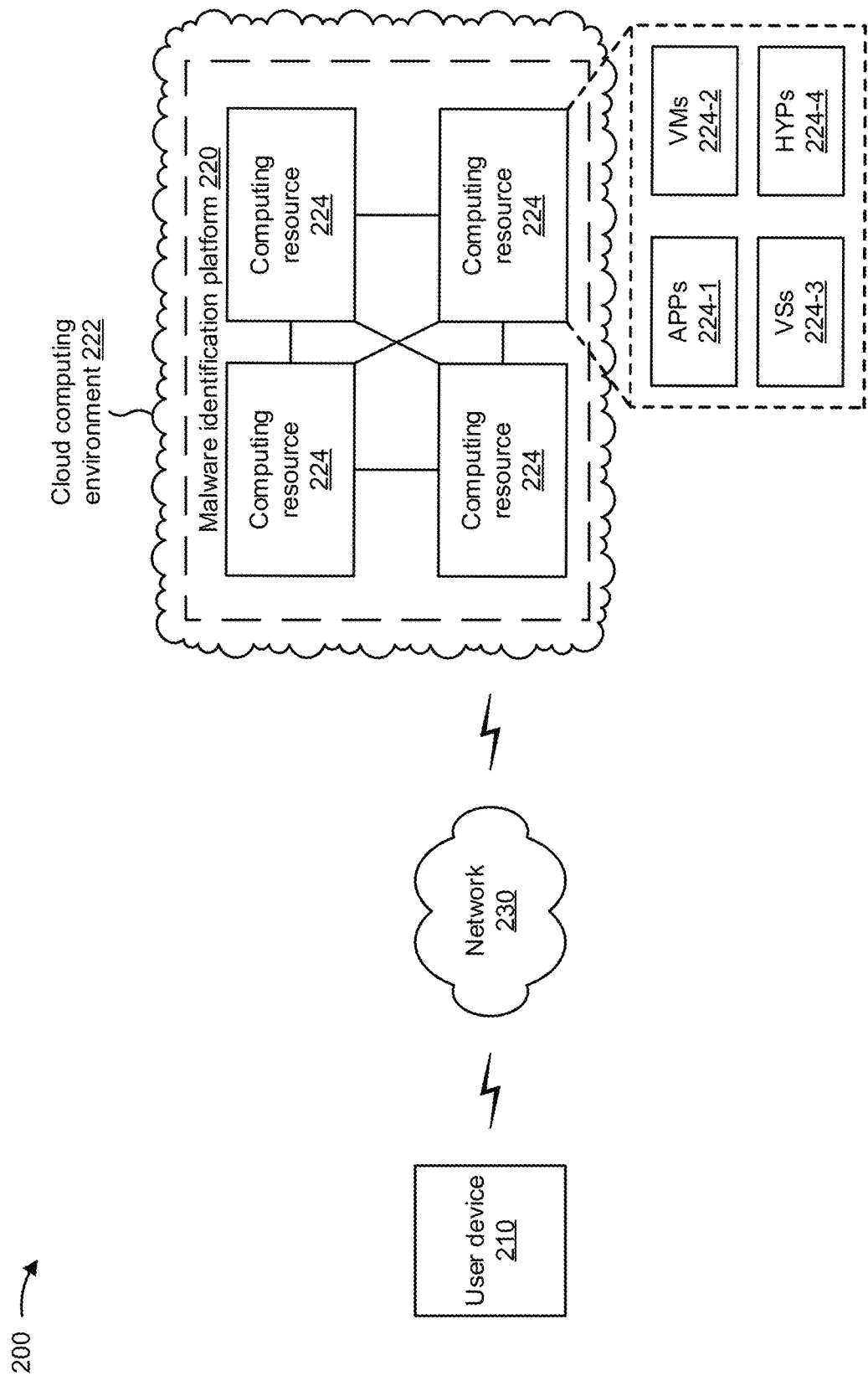
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a malware detection platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to malware detection platform 220.

Malware detection platform 220 includes one or more devices capable of detecting malware concealed by delay loops of software programs. In some implementations, malware detection platform 220 may be designed to be modular such that certain software components may be swapped in or out depending on a particular need. As such, malware detection platform 220 may be easily and/or quickly reconfigured for different uses. In some implementations, malware detection platform 220 may receive information from and/or transmit information to one or more user devices 210.

In some implementations, as shown, malware detection platform 220 may be hosted in a cloud computing environment 222. Notably, while implementations described herein describe malware detection platform 220 as being hosted in cloud computing environment 222, in some implementations, malware detection platform 220 may not be cloud-based (i.e., may be implemented outside of a cloud computing environment, such as within user device 210, a server device, and/or the like) or may be partially cloud-based.

Cloud computing environment 222 includes an environment that hosts malware detection platform 220. Cloud computing environment 222 may provide computation, software, data access, storage, etc. services that do not require end-user knowledge of a physical location and configuration of system(s) and/or device(s) that hosts malware detection platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host malware detection platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with malware detection platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of malware detection platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
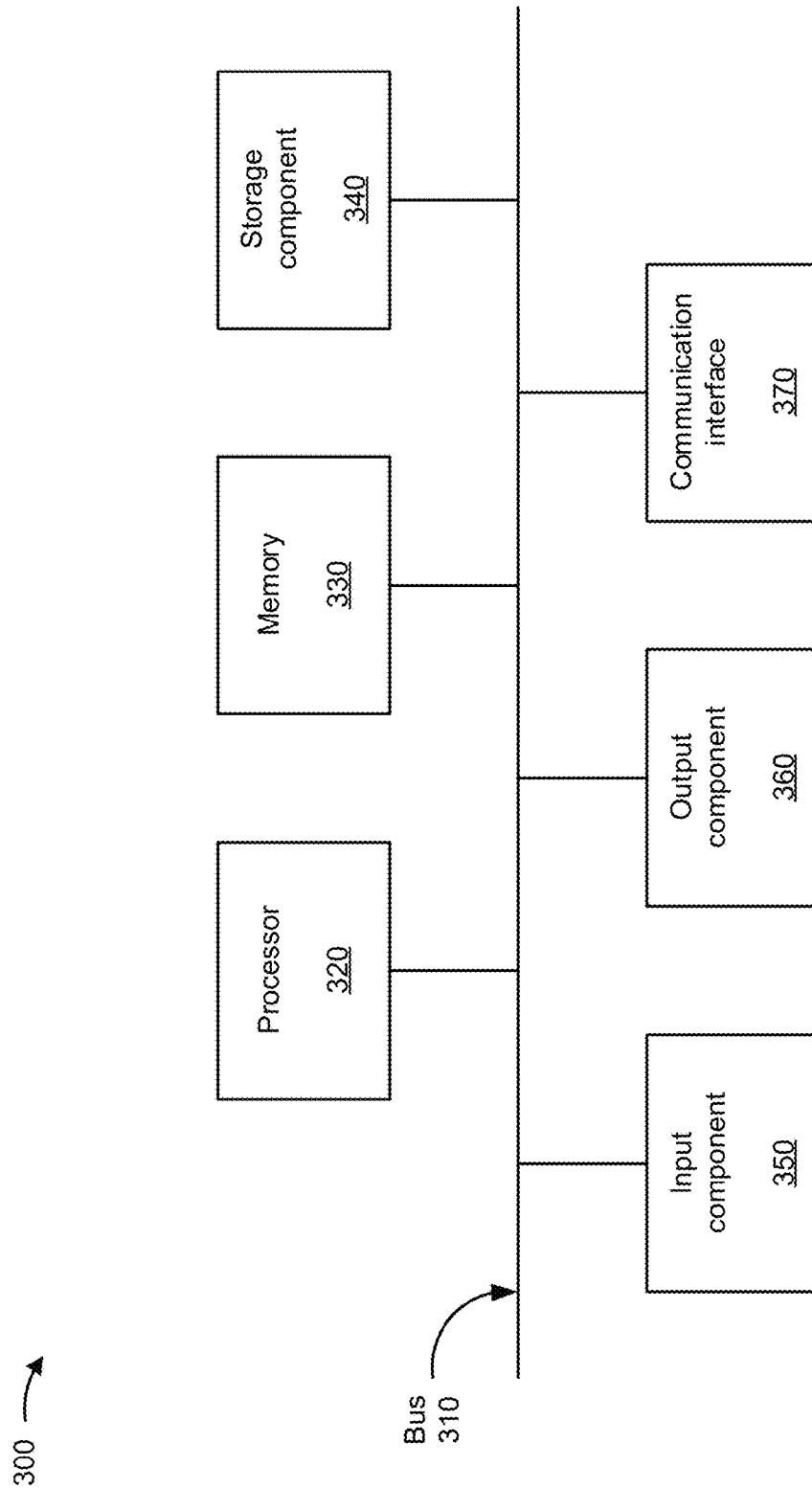
FIG. 3 is a diagram of example components of one or more devices of FIG. 2.

FIG. 3 is a diagram of example components of a device 300. Device 300 may correspond to user device 210, malware detection platform 220, and/or computing resource 224. In some implementations, user device 210, malware detection platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
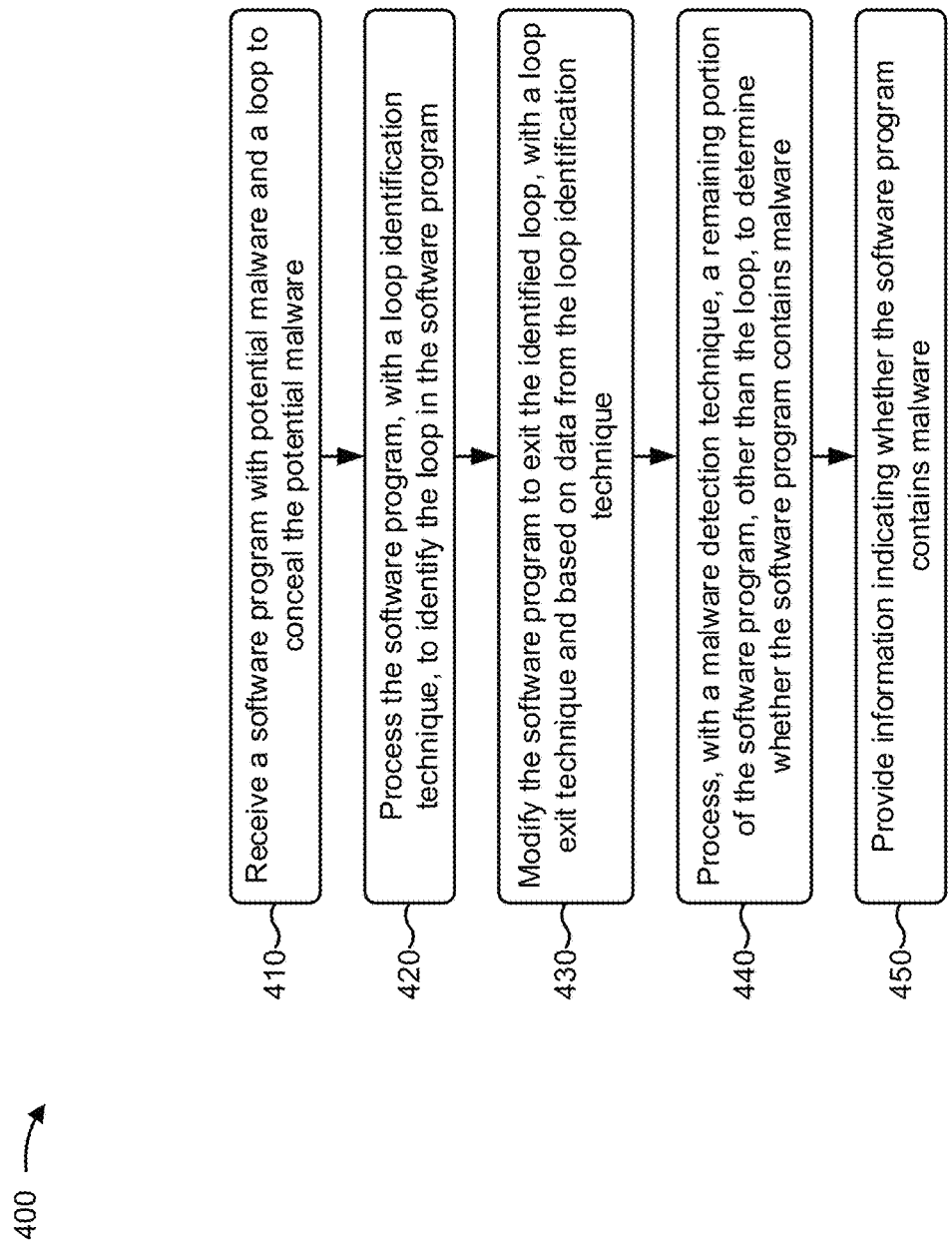
FIG. 4 is a flow chart of an example process for detecting malware concealed by delay loops of software programs.

FIG. 4 is a flow chart of an example process 400 for detecting malware concealed by delay loops of software programs. In some implementations, one or more process blocks of FIG. 4 may be performed by a malware detection platform (e.g., malware detection platform 220). In some implementations, one or more process blocks of FIG. 4 may be performed by another device or a group of devices separate from or including malware detection platform 220, such as user device 210.

As shown in FIG. 4, process 400 may include receiving a software program with potential malware and a loop to conceal to the potential malware (block 410). For example, the malware detection platform (e.g., using computing resource 224, processor 320, communication interface 370, and/or the like) may receive a software program with potential malware and a loop to conceal to the potential malware, as described above in connection with FIGS. 1A-2.

As further shown in FIG. 4, process 400 may include processing the software program, with a loop identification technique, to identify the loop in the software program (block 420). For example, the malware detection platform (e.g., using computing resource 224, processor 320, and/or the like) may process the software program, with a loop identification technique, to identify the loop in the software program, as described above in connection with FIGS. 1A-2.

As further shown in FIG. 4, process 400 may include modifying the software program to exit the identified loop, with a loop exit technique and based on data from the loop identification technique (block 430). For example, the malware detection platform (e.g., using computing resource 224, processor 320, and/or the like) may modify the software program to exit the identified loop, with a loop exit technique and based on data from the loop identification technique, as described above in connection with FIGS. 1A-2.

As further shown in FIG. 4, process 400 may include processing, with a malware detection technique, a remaining portion of the software program, other than the loop, to determine whether the software program contains malware (block 440). For example, the malware detection platform (e.g., using computing resource 224, processor 320, and/or the like) may process, with a malware detection technique, a remaining portion of the software program, other than the loop, to determine whether the software program contains malware, as described above in connection with FIGS. 1A-2.

As further shown in FIG. 4, process 400 may include providing information indicating whether the software program contains malware (block 450). For example, the malware detection platform (e.g., using computing resource 224, processor 320, communication interface 370, and/or the like) may provide information indicating whether the software program contains malware, as described above in connection with FIGS. 1A-2.

Process 400 may include additional implementations, such as any single implementation or any combination of implementations described below.

In some implementations, the malware detection platform, when processing the software program with the loop identification technique, may process the software program, based on a frequency count threshold, to identify the loop in the software program. In some implementations, the malware detection platform, when processing the software program with the loop identification technique, may process the software program, based on processor usage data, to identify the loop in the software program. In some implementations, the malware detection platform, when modifying the software program to exit the loop, may insert an unconditional jump instruction within the loop in the software program, where the unconditional jump instruction may cause the software program to jump to an instruction of the software program that is outside of the loop.

In some implementations, the malware detection platform, when modifying the software program to exit the loop, may provide, in the software program, an instruction pointer to which the loop is to exit. In some implementations, the malware detection platform, when modifying the software program to exit the loop, may modify registers at particular instructions within the loop, where the modified registers may cause the loop to be exited. In some implementations, the malware detection platform may provide information indicating whether the software program contains malware based on a result of processing the software program with the malware detection technique.

In some implementations, when the software program contains malware, the malware detection platform may prevent a user device from receiving the software program, remove the software program from the user device, instruct the user device to remove the software program from the user device, quarantine the software program for further analysis, add information regarding a source of the software program to a blacklist, notify a network administrator about determining that the software program contains malware, and/or the like.

In some implementations, the malware detection technique utilized by the malware detection platform may include a signature-based technique, a behavioral-based technique, a heuristic scanning-based technique, a file analysis-based technique, a weight-based heuristic technique, a rule-based heuristic technique, an application programming interface (API) call-based heuristic technique, a control flow graph-based heuristic technique, an N-Gram-based heuristic technique, an operational code-based heuristic technique, and/or the like.

In some implementations, the malware detection platform may provide information indicating that the software program contains malware. In some implementations, when the software program does not include malware, the malware detection platform may cause the software program to be sent to the user device, add information regarding a source of the software program to a whitelist, notify a network administrator that the software program does not contain malware, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a malware detection platform that detects malware concealed by delay loops of software programs. For example, the malware detection platform may receive a software program with potential malware and a loop to conceal the potential malware, and may process the software program, with a loop identification technique, to identify the loop in the software program. The malware detection platform may process the identified loop in the software program, with a loop exit technique and based on data from the loop identification technique, to exit the loop in the software program. The malware detection platform may process, with a malware detection technique, a remaining portion of the software program, other than the loop, to determine whether the software program contains malware, and may perform one or more actions based on whether the software program contains malware.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors to:
   receive a software program with potential malware and a loop to conceal the potential malware;
   process the software program, with a loop identification technique, to identify the loop in the software program based on processor usage data and a histogram of instruction addresses in the software program;
   modify, with a loop exit technique and based on data from the loop identification technique, the software program to exit the loop;
   process the software program, with a malware detection technique and after modifying the software program to exit the loop, to determine whether the software program contains malware; and cause one or more actions to be performed based on a result of processing the software program with the malware detection technique.

2. The device of claim 1, wherein the one or more processors, when processing the software program with the loop identification technique, are to:

process the software program, based on a frequency count threshold, to identify the loop in the software program.

3. The device of claim 1, wherein the one or more processors, when modifying the software program to exit the loop, are to:

insert an unconditional jump instruction within the loop in the software program,
the unconditional jump instruction to cause the software program to jump to an instruction of the software program that is outside of the loop.

4. The device of claim 1, wherein the one or more processors, when modifying the software program to exit the loop, are to:

provide, in the software program, an instruction pointer to which the loop is to exit.

5. The device of claim 1, wherein the one or more processors, when modifying the software program to exit the loop, are to:

modify registers at particular instructions within the loop, the modified registers to cause the loop to be exited.

6. The device of claim 1, wherein the one or more processors, when causing the one or more actions to be performed, are to:

provide information indicating whether the software program contains the malware based on the result of processing the software program with the malware detection technique.

7. The device of claim 1, wherein the one or more processors, when causing the one or more actions to be performed based on the result of processing the software program with the malware detection technique, are to:

cause one or more network devices to update rules to block the software program.

8. A non-transitory computer-readable medium storing instructions, the instructions comprising:

one or more instructions that, when executed by one or more processors, cause the one or more processors to:
receive a software program with potential malware and a loop to conceal the potential malware;
identify the loop in the software program with a loop identification technique based on processor usage data and a histogram of instruction addresses in the software program;
modify, with a loop exit technique and based on data from the loop identification technique, the software program to exit the loop;
process the software program, with a malware detection technique and after modifying the software program to exit the loop, to determine whether the software program contains malware;
determine that the software program contains the malware based on processing the software program with the malware detection technique; and
cause one or more actions to be performed based on determining that the software program contains the malware.

9. The non-transitory computer-readable medium of claim 8, wherein the one or more actions include one or more of:

prevent a user device from receiving the software program,
remove the software program from the user device,
instruct the user device to remove the software program from the user device,
quarantine the software program for further analysis,
add information regarding a source of the software program to a blacklist, or
notify a network administrator that the software program contains the malware.

10. The non-transitory computer-readable medium of claim 8, wherein the malware detection technique includes one or more of:

a signature-based technique,
a behavioral-based technique,
a heuristic scanning-based technique,
a file analysis-based technique,
a weight-based heuristic technique,
a rule-based heuristic technique,
an application programming interface (API) call-based heuristic technique,
a control flow graph-based heuristic technique,
an N-Gram-based heuristic technique, or
an operational code-based heuristic technique.

11. The non-transitory computer-readable medium of claim 8, wherein the one or more instructions, that cause the one or more processors to identify the loop in the software program, cause the one or more processors to:

identify the loop in the software program based on a frequency count threshold.

12. The non-transitory computer-readable medium of claim 8, wherein the one or more instructions, that cause the one or more processors to modify the software program to exit the loop, cause the one or more processors to one of:

insert an unconditional jump instruction within the loop in the software program,
the unconditional jump instruction to cause the software program to jump to an instruction of the software program that is outside of the loop, or
provide, in the software program, an instruction pointer to which the loop is to exit.

13. The non-transitory computer-readable medium of claim 8, wherein the one or more instructions, that cause the one or more processors to modify the software program to exit the loop, cause the one or more processors to:

modify registers at particular instructions within the loop, the modified registers to cause the loop to be exited.

14. The non-transitory computer-readable medium of claim 8, wherein the instructions further comprise:

one or more instructions that, when executed by the one or more processors, cause the one or more processors to:
provide information indicating that the software program contains the malware.

15. A method, comprising:

receiving, by a device, a software program with potential malware and a loop to conceal the potential malware;
processing, by the device, the software program, with a loop identification technique, to identify the loop in the software program based on processor usage data and a histogram of instruction addresses in the software program;
modifying, by the device, the software program to exit the loop using a loop exit technique and based on data from the loop identification technique;
processing, by the device and after modifying the software program to exit the loop, the software program with a malware detection technique to determine whether the software program contains malware; and selectively performing, by the device, an action based on a result of processing the software program with the malware detection technique, the action including a first action when the software program contains the malware, and the action including a second action when the software program does not contain the malware.

16. The method of claim 15, wherein the first action includes one or more of:

prevent a user device from receiving the software program, remove the software program from the user device, instruct the user device to remove the software program from the user device, quarantine the software program for further analysis, add information regarding a source of the software program to a blacklist, or notify a network administrator that the software program contains the malware.

17. The method of claim 15, wherein the second action includes one or more of:

cause the software program to be sent to a user device, add information regarding a source of the software program to a whitelist, or notify a network administrator that the software program does not contain the malware.

18. The method of claim 15, wherein processing the software program with the loop identification technique comprises:

processing the software program, based on a frequency count threshold, to identify the loop in the software program.

19. The method of claim 15, wherein modifying the software program to exit the loop comprises one of:

inserting an unconditional jump instruction within the loop in the software program, the unconditional jump instruction to cause the software program to jump to an instruction of the software program that is outside of the loop;

providing, in the software program, an instruction pointer to which the loop is to exit; or modifying registers at particular instructions within the loop, the modified registers to cause the loop to be exited.

20. The method of claim 15, further comprising:

providing information indicating whether the software program contains the malware.

* * * * *